United States Patent [19]

Morishita

[11] Patent Number: 5,761,688
[45] Date of Patent: Jun. 2, 1998

[54] DICTIONARY RETRIEVAL APPARATUS

[75] Inventor: Taro Morishita, Nara, Japan

[73] Assignee: Sharp Kabushiki Kaisha, Osaka, Japan

[21] Appl. No.: 576,611

[22] Filed: Dec. 21, 1995

[30] Foreign Application Priority Data

Dec. 26, 1994 [JP] Japan .................. 6-322764

[51] Int. Cl.⁶ ...................................... G06F 17/22
[52] U.S. Cl. ...................... 707/532; 707/533; 707/536
[58] Field of Search ........................... 707/532–536, 707/1–5; 704/10; 341/67

[56] References Cited

U.S. PATENT DOCUMENTS

| | | | |
|---|---|---|---|
| 4,845,612 | 7/1989 | Sakai et al. | 345/193 |
| 4,893,232 | 1/1990 | Shimaoka et al. | 707/1 |
| 4,903,206 | 2/1990 | Itoh et al. | 707/533 |
| 4,959,785 | 9/1990 | Yamamoto et al. | 707/533 |
| 5,254,990 | 10/1993 | Yoshida et al. | 341/51 |
| 5,499,359 | 3/1996 | Vijaykumar | 707/201 |

FOREIGN PATENT DOCUMENTS

| | | |
|---|---|---|
| 36 9829A3 | 5/1990 | European Pat. Off. |
| 61-285573 | 12/1986 | Japan . |
| 31 27254 | 5/1991 | Japan . |
| 50 54077 | 3/1993 | Japan . |

Primary Examiner—Joseph H. Feild

[57] ABSTRACT

An index structure of a dictionary retrieval apparatus includes a first index, a second index, a heading main index, and a differential character train buffer. An item for each word in the index is accessed via the first and second indexes. Access to succeeding and receiving items in the index is carried out at high speed since the item has data of a fixed length. The item includes the number of overlapping characters with a previous word, a differential character train length with respect to a previous word, and a pointer indicating a storage position of a differential character train with respect to a previous word in the differential character train buffer. The buffer has a differential character train with respect to a preceding word stored without duplication of any partial character train in the buffer. Therefore, the memory capacity used by the buffer can be suppressed.

10 Claims, 11 Drawing Sheets

DICTIONARY RETRIEVAL APPARATUS

BACKGROUND OF THE INVENTION

1. Field of the Invention

The present invention relates to dictionary retrieval apparatuses, and more particularly, to a dictionary retrieval apparatus used in devices incorporating a language processing function such as a word processor.

2. Description of the Background Art

In information processors such as word processor and personal computers, devices incorporating dictionary data such as those of a general dictionary and English-Japanese dictionary from which required data can be retrieved electronically (referred to as "electronic dictionary" hereinafter) are now becoming common. A retrieval function of high speed is particularly sought due to the large capacity of such dictionary data.

An electronic dictionary generally requires a retrieval index of great capacity corresponding to the number of items in the dictionary. Since the heading index has different length of the character train for respective heading, a variable length index structure is often employed. Such a variable length index structure is disadvantageous in that the access to the required index is time consuming. Furthermore, size information to access the preceding and succeeding indexes is required, which will further increase the overall capacity. This will be described hereinafter.

Figure 11A:
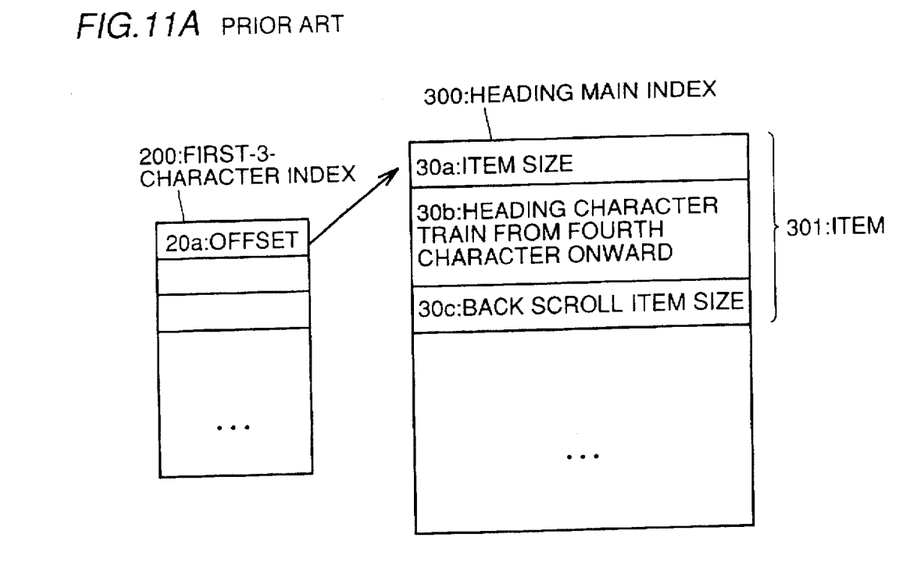
FIGS. 11A and 11B show general structures of a conventional variable length heading index.
Figure 11B:
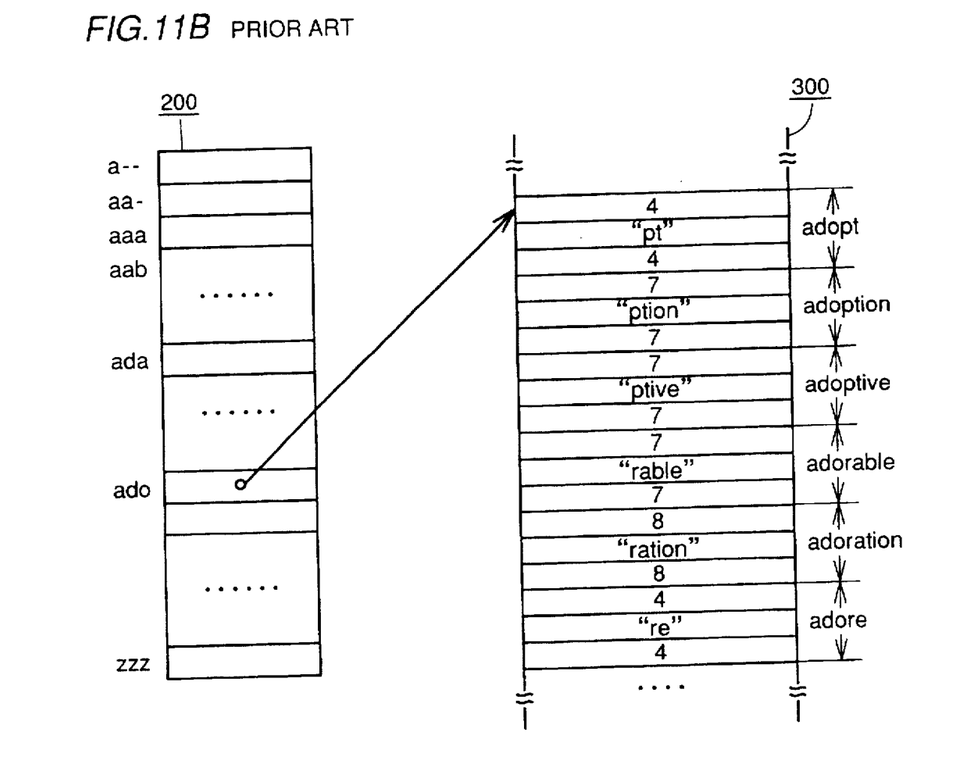

FIGS. 11A and 11B show a general structure of a conventional variable length heading index. The variable length heading index includes a first-3-character index 200 and a heading main index 300. Index 200 is constituted of an offset 20a corresponding to main index 300 (position from the start of the main index) of each of a plurality of headings extracted from the dictionary for every change in the first three characters of all the headings. Index 300 includes the list of all the headings arranged in the order in the dictionary such as in an alphabetical order. For the sake of simplification, only the heading portion is shown in the drawing. Index 300 is formed of an item 301 including an item size 30a for each heading, a character train 30b from the fourth character onward of the character train of a heading, and a back-scroll item size 30c. Fourth character and et seq. character train 30b is data of a variable length since the length of the character train of respective headings is variable. As shown in FIG. 11A, the size of each item 301 must be provided in advance as item size 30a and back-scroll item size 30c therein in order to scroll up/down each item 301 in index 300.

FIG. 11B shows a specific structure of indexes 200 and 300 of FIG. 11A.

The index structure of FIGS. 11A and 11B have the following disadvantages (1)–(3).

(1) It is needed to obtain offset 20a from the size of each heading in scrolling up/down the headings.

(2) When an English-Japanese dictionary is envisaged for heading main index 300, 3 bytes are required for offset 20a of heading main index 300 since the capacity will exceed 64 kilobytes with approximately 10000 terms. Therefore, the capacity of another index referring to the heading, in this case index 200, increases.

(3) The size of heading main index 3 is great.

The time required for access can be shortened by employing an index structure of a fixed length for index 300 by means of providing the variable length data portion of each heading outside main index 300. However, extra information will be required to access that variable length data portion, resulting in an amount of capacity greater than that of the variable length index structure. This will be described hereinafter.

Figure 12A:
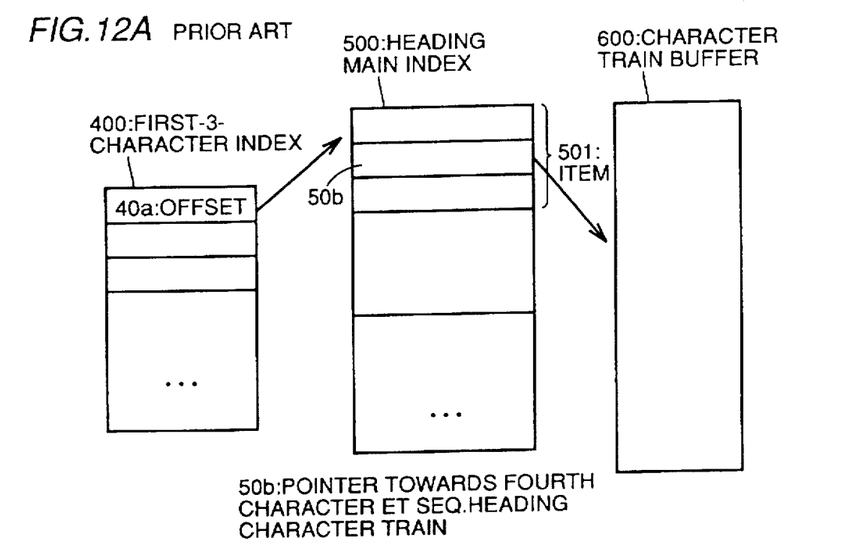
FIGS. 12A and 12B show structures of a heading index in which a conventional heading main body includes only a pointer data of a fixed length.
Figure 12B:
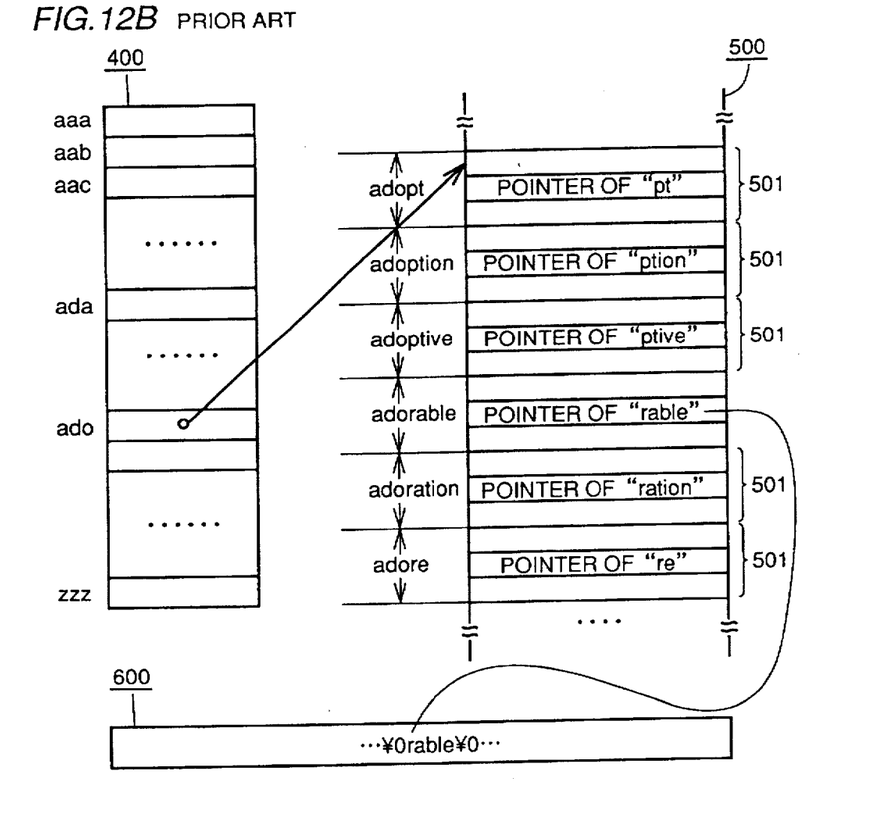

FIGS. 12A and 12B show a heading index structure in which the conventional heading main index includes only pointer data of a fixed length. This index includes a first-3-character index 400, a heading main index 500, and a character train buffer 600. Index 400 includes an offset 40a with respect to main index 500 for each of a plurality of headings derived from the dictionary for every change in the first three characters of the heading. Data corresponding to the fourth character and et seq. heading character train 30b of FIG. 11A for each heading with a delimiter code (Ψ0) is stored in character train buffer 600. Index 500 includes an item 501 for each heading. Item 501 includes a pointer 50b indicating the character train of the fourth character and onward of a heading in buffer 600 for each corresponding heading. Index 500 includes only pointer data 50b of a fixed length for each heading to solve the problem of a variable structure which is one disadvantage of the index structure of FIGS. 11A and 11B. A specific example of an index structure of FIG. 12A is shown in FIG. 12B.

Since the index structure of FIGS. 12A and 12B can have the heading managed by a serial number, only 2 bits is required for offset 40a of heading main index 500 for a dictionary that has a capacity of not more than 64K of heading terms. Furthermore, the access time can be shortened since the scroll of main index 500 can be carried out by imcrementing/decrementing (increment of 1/decrement of 1) of the pointer. However, this structure will still have a great memory capacity due to main index 500 and character train buffer 600 in contrast to that of a variable length structure.

Conventional reduction of the capacity required for a heading index is mainly classified into the approach of establishing a difference by gathering several common characters from the beginning of each heading into an index of a lower order, and the approach of allocating a 2-byte code appearing frequently in a heading into an empty region of 1 byte. However, the amount of required capacity that can be reduced by this approach is limited. It was not conventionally possible to form an index that employs a fixed length heading index structure while suppressing the amount of the required memory capacity.

Technique employing a variable length index structure is disclosed in Japanese Patent Laying-Open Nos. 61-285573 and 3-127254. Furthermore, Japanese Patent Laying-Open No. 5-54077 discloses a technique of compressing a partial character train excluding the first N characters common to those of an adjacent heading for respective headings.

According to the art of the above-mentioned Japanese Laying-Open Nos. 61-285573, 3-127254, and 5-54077, an additional retrieval function that requires another discrete headings such as retrieval from a conjugation/inflection of a verb/noun or retrieval of an idiom cannot be easily provided in an apparatus that is limited in capacity and cost since the only possible way was to increase the capacity corresponding to that index data of the additional function. This will be described hereinafter.

Figure 13:
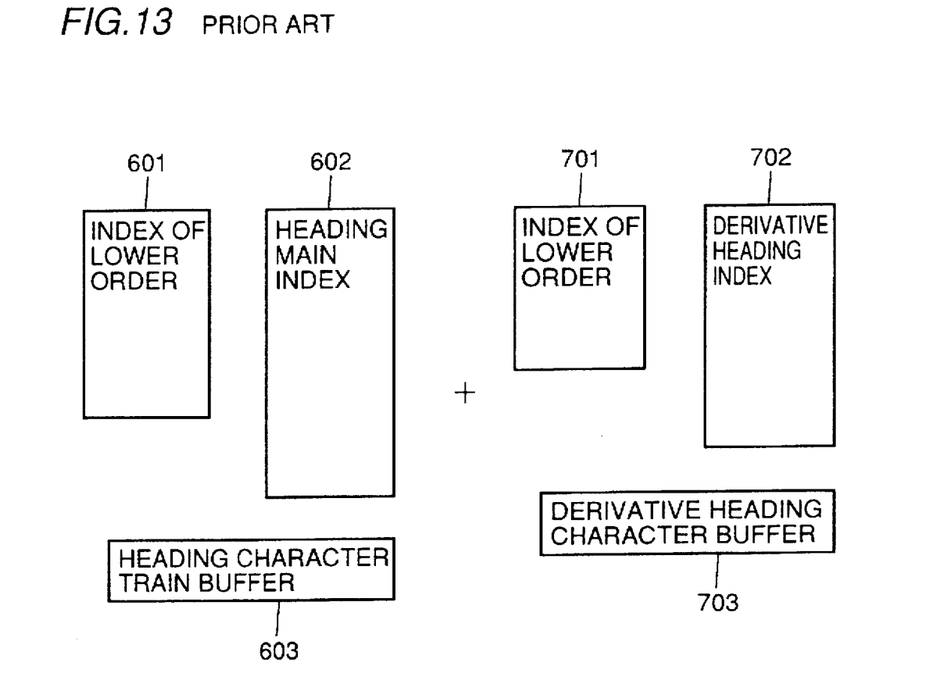
FIG. 13 schematically shows an index structure of the case where a derivative retrieval function is supplemented to a conventional heading retrieval function.

FIG. 13 schematically shows an index structure in which a derivative retrieval function is supplemented to a conventional heading retrieval function. An index as shown in FIG. 13 is prepared when a derivative retrieval function to allow retrieval from a conjugation/inflection of a heading is additionally provided to a heading retrieval function. In this case, index data of a structure similar to that of a heading retrieval index is prepared for a derivative heading with respect to each derivative. This is added to the original index data for heading retrieval with no sharing of the index data. More specifically, the capacity of the entire index data when a derivative retrieval function is added is AZ+BZ where AZ is the capacity of the original heading index data (the total capacity of index 601 of a lower order, heading main index 602, and heading character train buffer 603), and BZ is the capacity of the additional derivative index data (index 701 of a lower order, derivative index 702, and derivative character train buffer 703). It is appreciated that the capacity of the index is inevitably increased in proportion to the additional application of a retrieval function. Supplement of a retrieval function is difficult for apparatuses that have limited memory capacity.

SUMMARY OF THE INVENTION

An object of the present invention is to provide a dictionary retrieval apparatus that can suppress increase of the capacity of a memory occupied by an index unit while effecting high speed dictionary retrieval using the index unit.

Another object of the present invention is to provide a dictionary retrieval apparatus that can suppress increase in capacity of a memory occupied by an index unit employed for dictionary retrieval in a retrieval function extension due to supplement of a retrieval dictionary.

A dictionary retrieval apparatus according to an aspect of the present invention includes an index unit for retrieving dictionary data in which at least a plurality of headings are registered in its dictionary order. A specified heading is retrieved from the dictionary data via the index unit, and a result thereof is output. The index unit includes a character train buffer, a main index and a subindex.

For each of the plurality of headings in the dictionary data, a differential character train which is a partial character train that does not match the character train of a heading registered right before a certain heading in the dictionary data of that character train is stored in the character train buffer. The differential character train is connected to the end of relevant character train without overlapping any partial character train in the existing character train already stored in the character train buffer.

The main index includes an item of a fixed length in the dictionary order corresponding to each of the plurality of headings in the dictionary data. Each item includes matching length information indicating the length of a partial character train identical to the character train of a heading registered right before a certain heading in the dictionary data of the character train of the corresponding heading, differential length information indicating the length of the differential character train, and position information indicating the stored position of the differential character train in the character train buffer.

The subindex is provided to access respective contents of the plurality of items in the main index according to the character train of a specified heading.

According to a dictionary retrieval apparatus of the above-described structure, the main index is formed so as to have a fixed length of each item therein, and a differential character train is stored in the character train buffer with no redundancy and without using a delimiter code. Therefore, increase in the memory capacity associated with the main index and the character train buffer, as well as the memory capacity of the index unit is suppressed. Thus, the amount of memory capacity required for the apparatus can be reduced to lower the cost of the apparatus.

The apparatus further includes an extended index unit which is an extension of the index unit when another dictionary data different from the already existing dictionary data is added. This extended index unit includes an extended character train buffer substituted for the above-described character train buffer, a main index having the position information in the above-described item updated with information indicating the stored position of a corresponding differential character train in the extended character train buffer, a subindex, a supplemental main index which is the main index corresponding to the additional dictionary data, and a supplemental subindex which is the subindex corresponding to the supplemental dictionary data.

Similar to the above-described character train buffer, since a plurality of differential character trains obtained corresponding to the existing dictionary data and a plurality of differential character trains obtained corresponding to the supplemental dictionary data are stored in the extended character train buffer. The differential character train is concatenated to the end of the character train without using a delimiter code and with no duplication of any partial character train in the existing character train already stored in the buffer. The extended character train buffer has data stored with no redundancy, so that the memory capacity of that buffer can be suppressed.

Furthermore, since the supplement main index is formed of items of a fixed length similar to the above-described main index, increase of the memory capacity used by the supplement main index is suppressed.

The extended character train buffer is formed so as to be commonly shared in the retrieval of the existing dictionary data and the retrieval of the supplement dictionary data with no redundancy of data. Furthermore, the extended index unit is formed so as to allow this share. Therefore, increase in the memory capacity of the index unit associated with the addition of the dictionary data for retrieval can be suppressed.

Since an item of a fixed length is employed in a main index corresponding to each dictionary data, the access time to a corresponding main index via each subindex is reduced to increase the speed of the retrieval process.

Even when dictionary data for retrieval is added, functional performance and cost performance of the apparatus can be improved simultaneously by virtue of suppressing the increase of the memory capacity required by the index unit and reduction of the retrieval time period by the main index with a fixed length structure.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 3:
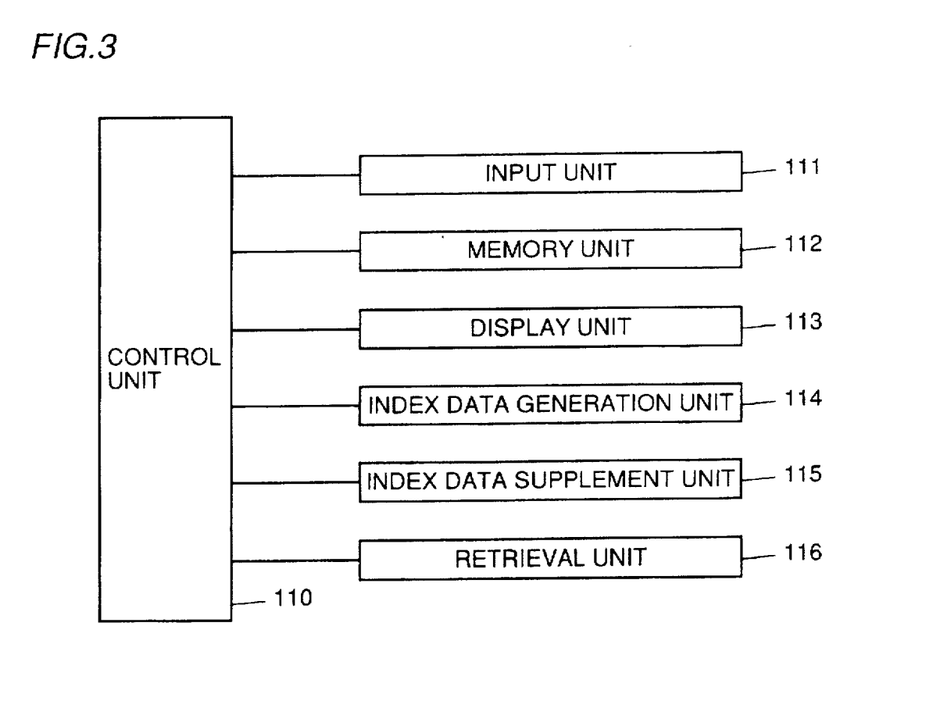
FIG. 3 shows a functional block structure of a word dictionary retrieval apparatus according to an embodiment of the present invention.
Figure 4:
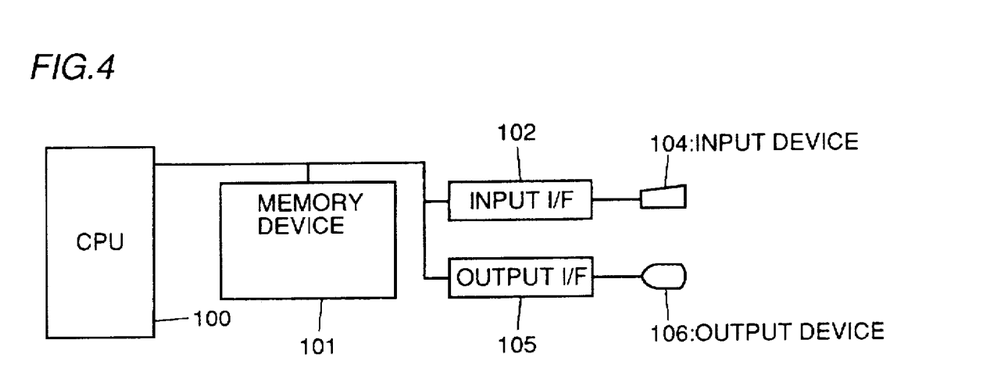
FIG. 4 shows a hardware structure of a word dictionary retrieval apparatus according to an embodiment of the present invention.

First, components of the apparatus of the present invention will be described with correspondence between each function of block of FIG. 3 and each hardware of FIG. 4. Referring to FIG. 3, the apparatus functionally includes a control unit 110, an input unit 111, a memory unit 112, a display unit 113, an index data generation unit 114, and an index data supplement unit 115, and a retrieval unit 116.

Input unit 111 includes an input device 104 such as a key board, an OCR (Optical Character Reader), or a pen, and an input I/F (interface) 102 for data transfer with an external apparatus such as a computer to enter a character train for retrieval and source data of a dictionary.

Memory unit 112 includes a general memory device 101 of a computer or the like formed of an ROM (Read Only Memory) and an RAM (Random Access Memory) to store various data such as index data for retrieval, object data for execution associated with retrieval unit 116 and retrieval resultant data, and source data of a dictionary. Display unit 113 includes an output device 106 such as a liquid crystal display or a CRT (cathode ray tube) and an output I/F 105 for data transfer with a computer to display a train of input characters and retrieval result data.

Index data generation unit 114 includes logic for generating index data of small capacity according to a method that will be described afterward, and storing the same in memory device 101. A portion of memory device 101 corresponds to index data generation unit 114.

Index data supplement unit 115 includes logic for generating index data of small capacity having the additional capacity suppressed to a minimum and storing the same in memory device 101. A portion of memory device 101 corresponds to index data supplement unit 115.

Retrieval unit 116 includes logic for scrolling the retrieval index stored in memory device 101 while carrying out a comparing process of a character train associated with an input character train to access the source data of the dictionary meeting the retrieval requirement for extracting the required data. A portion of memory device 101 corresponds to retrieval unit 116. For the sake of simplification, the dictionary source data and retrieval unit 116 are illustrated only as the heading main index data in which only headings are stored and a heading retrieval function, respectively.

Control unit 110 calls up data generation unit 114 or data supplement unit 115 in memory device 101 to interpret and execute the logic therein while controlling the above-described various elements. Control unit 110 also calls up retrieval unit 116 in memory device 101 to interpret and execute a series of retrieval logics. CPU (Central Processing Unit) 100 corresponds to control unit 110.

Figure 1:
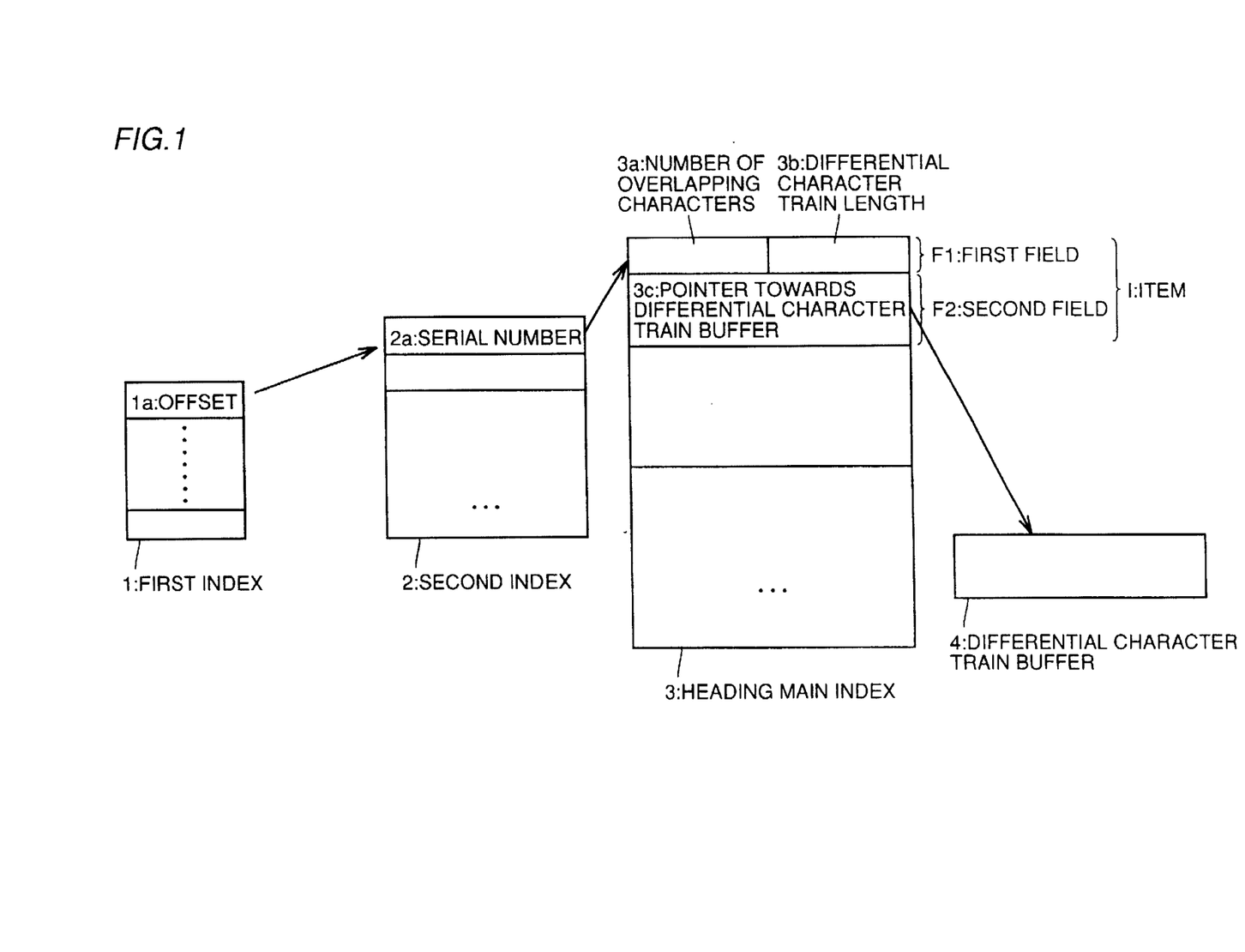
FIG. 1 shows a schematic structure of an index according to an embodiment of the present invention.
Figure 2:
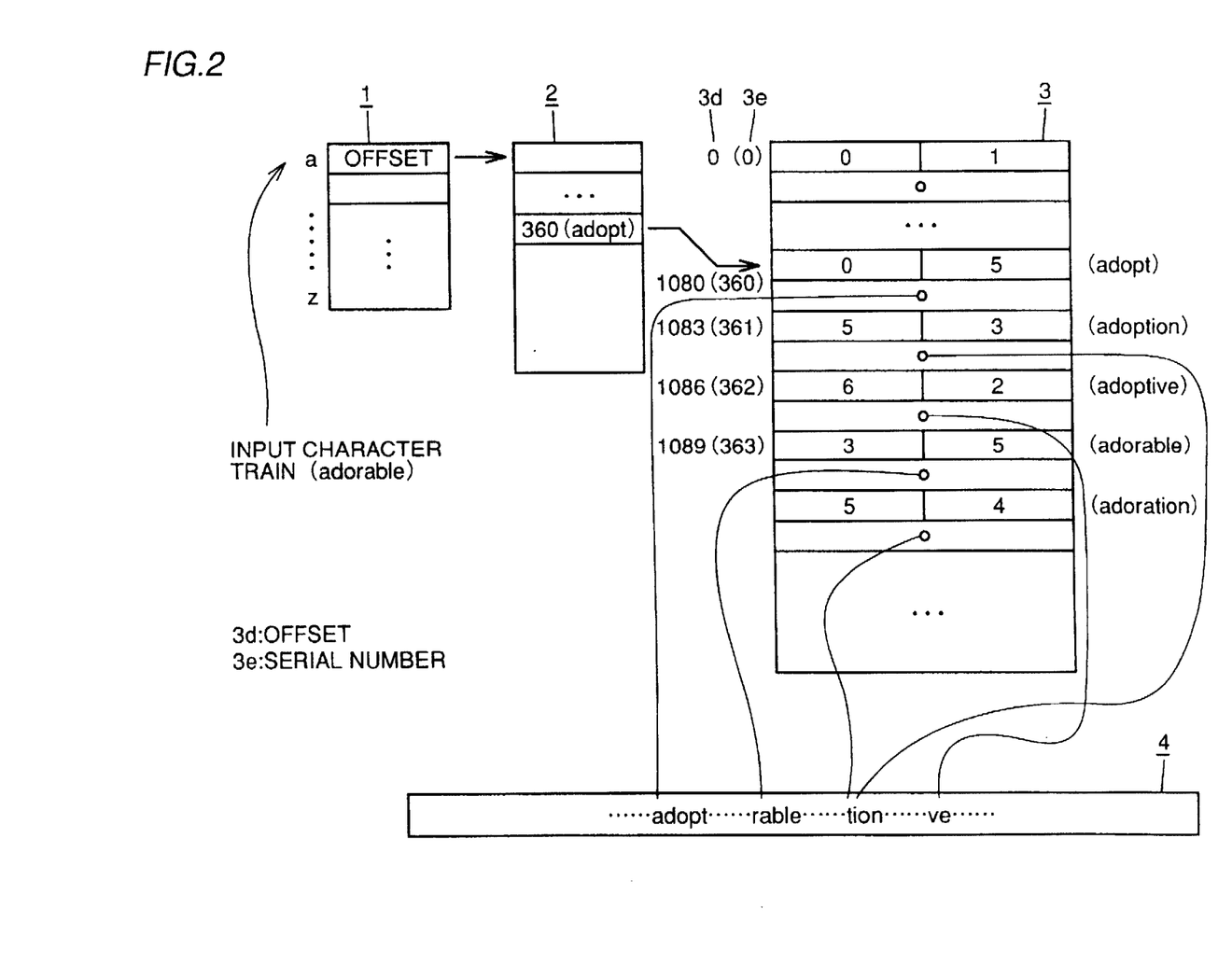
FIG. 2 shows a specific structure of an index according to an embodiment of the present invention.

FIGS. 1 and 2 show structures of a heading index data that allows the memory capacity associated with the retrieval index suppressed to a minimum.

Referring to FIG. 1, the index structure of the present embodiment allows access of a differential character train buffer 4 and a heading main index 3 in which information of each heading is arranged and stored in dictionary order via a first index 1 of the first character of a heading and a second index 2 for every m headings. Heading main index 3 includes an item I for each heading in the dictionary. The size of item I is a fixed length of K bytes. The value of K depends upon the class of the dictionary. For example, K=3 is sufficient for an English-Japanese dictionary of a middle class including approximately 40000 headings. K=4 is sufficient even for a large dictionary having approximately one hundred thousands to two hundred thousand headings.

Item I includes a first field F1 and a second field F2. Field F1 includes data of a number of overlapping characters 3a indicating the number of characters in a corresponding heading that overlaps with one preceding heading registered in the dictionary, and a differential character train length 3b indicating the number of different characters between a corresponding heading and one preceding heading registered in the dictionary. The second field F2 includes data of a pointer 3c toward differential character train buffer 4. The first byte of item I is allocated for the first field F1, and the remaining K−1 bytes of item I are allocated for the second field F2. In field F1, several bits of higher significance are allocated for the number of the overlapping characters 3a, and the less significant remaining bits are allocated for differential character train length 3b. The specific number of bits to be allocated depends upon the class of the dictionary. In the case of an English-Japanese dictionary of a middle class with approximately 40000 headings, 3 bits are sufficient for number of overlapping characters 3a (that is, up to 7 overlapping characters), and 5 bits are sufficient for differential character train length 3b (that is, up to 31 characters). Pointer 3c indicating the offset position from the beginning of differential character train buffer 4 is written in second field F2. 2 bytes are sufficient for the second field F2 (in contrast to the 3 bytes in a general method) in an English-Japanese dictionary of a middle class of approximately 40000 headings.

First index 1 stores offset 1a of the first item (heading) I in the dictionary with a different first character on second index 2. First index 1 has a structure as shown in FIG. 2 in the case of an English-Japanese dictionary. Second index 2 stores a serial number 2a of a heading for every different first character of a heading in the dictionary, or for every m headings. Serial number 2a indicates the order of registration of a corresponding heading in the dictionary. Serial number 2a is obtained when the source data of a dictionary is entered into the apparatus. Serial number 2a starts from 0. In FIG. 2, a heading "adopt" is extracted from the dictionary as one of the fortieth heading. Serial number 2a is shown to be 360.

Since the size of one item I in heading main index 3 has a fixed length of K bytes as described above, the position on index 3 that is to be accessed from second index 2 can be easily obtained as (serial number 2a obtained from second index 2)×K bytes.

In differential character train buffer 4, a partial character train (differential character train) starting from the first character that does not match between a character train of a certain heading and a character train of one preceding heading registered in the dictionary up to the last character is registered with no overlapping of any partial character train already registered in buffer 4 by comparing each character train of the certain heading with that of the preceding heading from the first character.

As to item I of heading "adorable", (1089th byte, serial number 363), for example, in heading main index 3 shown in FIG. 2, the first three letters duplicate with the preceding heading "adoptive", so that 3 is set in the number of overlapping characters 3a, and 5 is set in differential character train length 3b according to the character train length of the differential character train "rable" being 5. Pointer 3c towards differential character train buffer 4 is set so as to indicate the position of the first character of the partial character train of "rable" in buffer 4.

According to the index structure shown in FIG. 1, a heading can be accessed by a "serial number" since the data for a heading (item I) has a fixed length. Therefore, proceeding and succeeding items I can be easily accessed. Furthermore, when a heading (item I) is to be referred to from another index, the index capacity can be reduced than the case where the description by offset data is provided. For example, if the length is not fixed, second index 2 will require 3 bytes for each serial number 3e (for example, in the case of first-3-character index 400 of FIG. 12). In contrast, only a 2-byte structure is required if the length is fixed in the case of a dictionary of a level that has less than 64K terms. Furthermore, increase in capacity due to the index structure taking a fixed length (increase due to the area for the pointer information towards the required character train buffer) is of no problem since differential character train buffer 4 can be formed having a capacity of approximately a fraction of a general one (character train buffer 600 in FIG. 12) by means of a generation method that is described afterwards.

Figure 5:
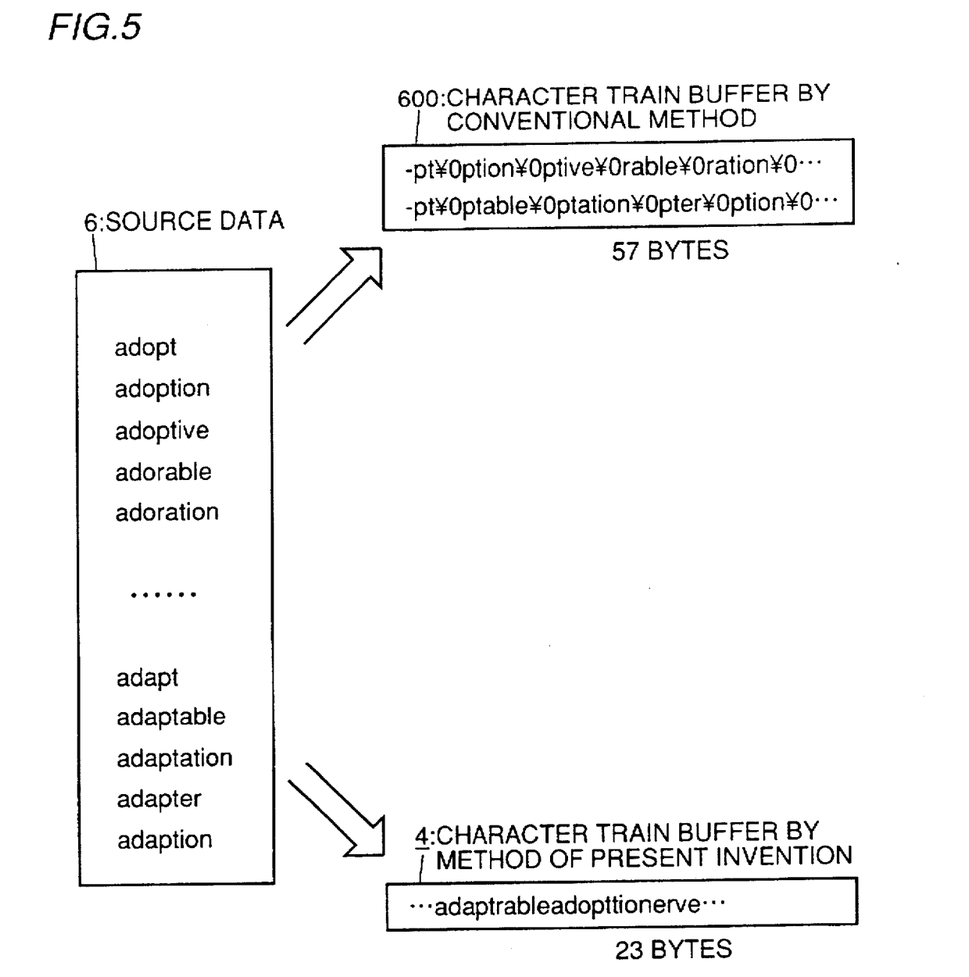
FIG. 5 is a diagram for describing the effect of a differential character train buffer for reducing the capacity of index data according to an embodiment of the present invention.

FIG. 5 shows source data 6 associated with a dictionary, character train buffer 600 associated with source data 6 according to a conventional method described with reference to FIG. 12, and differential character train buffer 4 associated with source data according to a method of the present embodiment shown in FIG. 1.

Since character train buffer 600 formed by the conventional method of FIG. 12 has each differential character train entirely registered with a delimiter ($\Psi$0), a plurality of the same character trains or partial character trains will be provided in different locations in buffer 600. The data in buffer 600 is redundant. In contrast, differential character train buffer 4 formed by the procedure shown in FIG. 1 has differential character trains sorted in a descending order of the differential character train length concatenated to the end of the character train of buffer 4 only when not matching the partial character train of the already-registered character train in FIG. 4. Therefore, there is no redundancy in data in buffer 4. It is appreciated from FIG. 5 that the method of the present embodiment is effective in the structure of a differential character train buffer since many analogous character trains are present in the differential character train.

Index data generation will be described hereinafter with reference to the flow chart of FIG. 6.

First, a set M in which only headings extracted from the source data of a dictionary are arranged in the dictionary order is prepared (T1). Set M includes a plurality of elements (headings) Mi, where i is a serial number. The contents of the headings in the dictionary are written into a file in memory device 101 via input unit 111 of FIG. 3 in a format in which each heading can be easily identified. Here, a serial number for each heading is also obtained.

Next, a serial number 2a is sequentially registered counting from the 0th heading extracted for every change in the first character of a heading or for every m headings. This registration of serial numbers is stored in second index 2 (T2). Although not shown in the flow chart, generation of first index 1 is implemented by sequentially registering each position where dictionary serial number 2a is written of the different first character in second index 2 (offset 1a from the beginning of second index 2).

If the element Mi has a serial number i that is registered in second index 2, 0 is set in the number of overlapping characters Di (number of overlapping characters 3a), the length of the character train of the heading of element Mi is set in differential character train length Si (differential character train length 3b), and the actual heading character train of element Mi is set in differential character train MSi of heading main index 3 corresponding to serial number i (T4). If serial number i of the element Mi is not registered in second index 2, number of overlapping characters 3a, the differential character train, and differential character train length 3b for element Mi−1 and element Mi are obtained. The obtained values are appropriately set in the number of overlapping character Di, differential character train Si, and differential character train length MSi (T3). A set S of a differential character train MSi extracted for all headings is sorted in a descending order of a length of the character train to generate a length descending order differential character train set S' (T5).

In order to form character train buffer 4, an initial value of working character train buffer mjb is set in an empty character train, and each element S'i (i=0−n) of set S' is sequentially registered (all those although required to be registered) in order in buffer mjb (T6). Registration of element S'i in buffer mjb is carried out according to whether element S'i matches any partial character train already registered in buffer mjb (T7). When element S'i matches a partial character train, an offset set in buffer mjb of that partial character train is obtained and set as a pointer Pi (pointer 3c) to character train buffer 4 (T8). Although not shown in the process flow, −1 is set in pointer Pi (pointer 3c) when the differential character train is an empty character train (T8). When element S'i does not match any of the partial character trains already registered in buffer mjb, that differential character train is newly registered by adding the character train of element S'i to the end of the registered character train in buffer mjb. Since the registered position is the end of the registered character train in buffer mjb, the character train length of buffer mjb prior to the addition of a character train of element Si is to be set in pointer Pi (pointer 3c) (T9). Although the suffix (i) of pointer Pi indicates the number of the differential character train in the order of the length, it is assumed that suffix (i) of pointer Pi is associated with a serial number of the corresponding heading in advance in obtaining a differential character train in order to identify the stored position of pointer Pi in heading main index 3.

Upon completion of the registration operation (T6–T9) of the index with respect to all the differential character trains of headings (no at T10), the contents for item I in heading main index 3 are obtained, and differential character train buffer 4 is formed at the same time for all the headings (T11).

Figure 6:
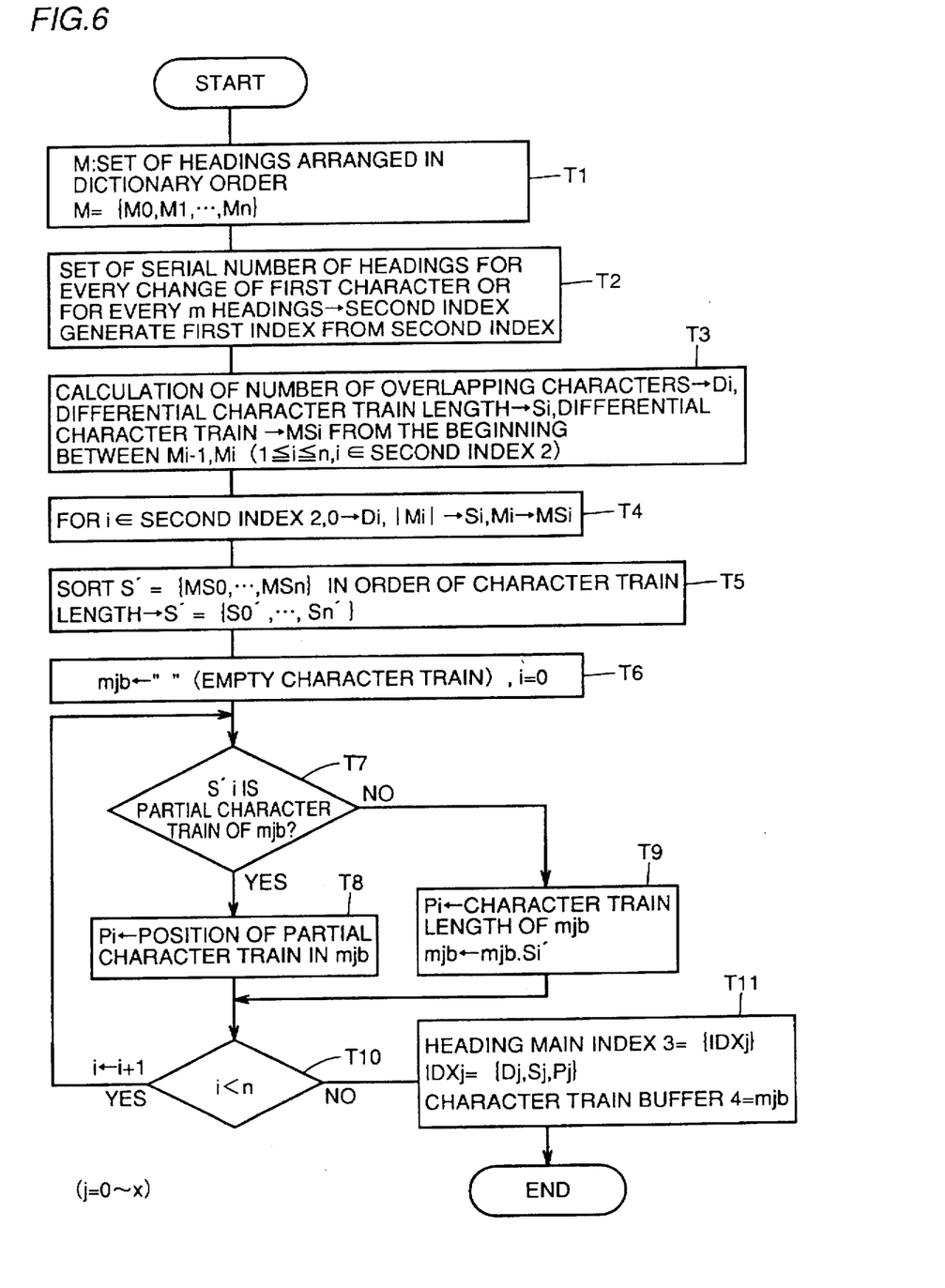
FIG. 6 is a flow chart of an index data generation process according to an embodiment of the present invention.
Figure 7:
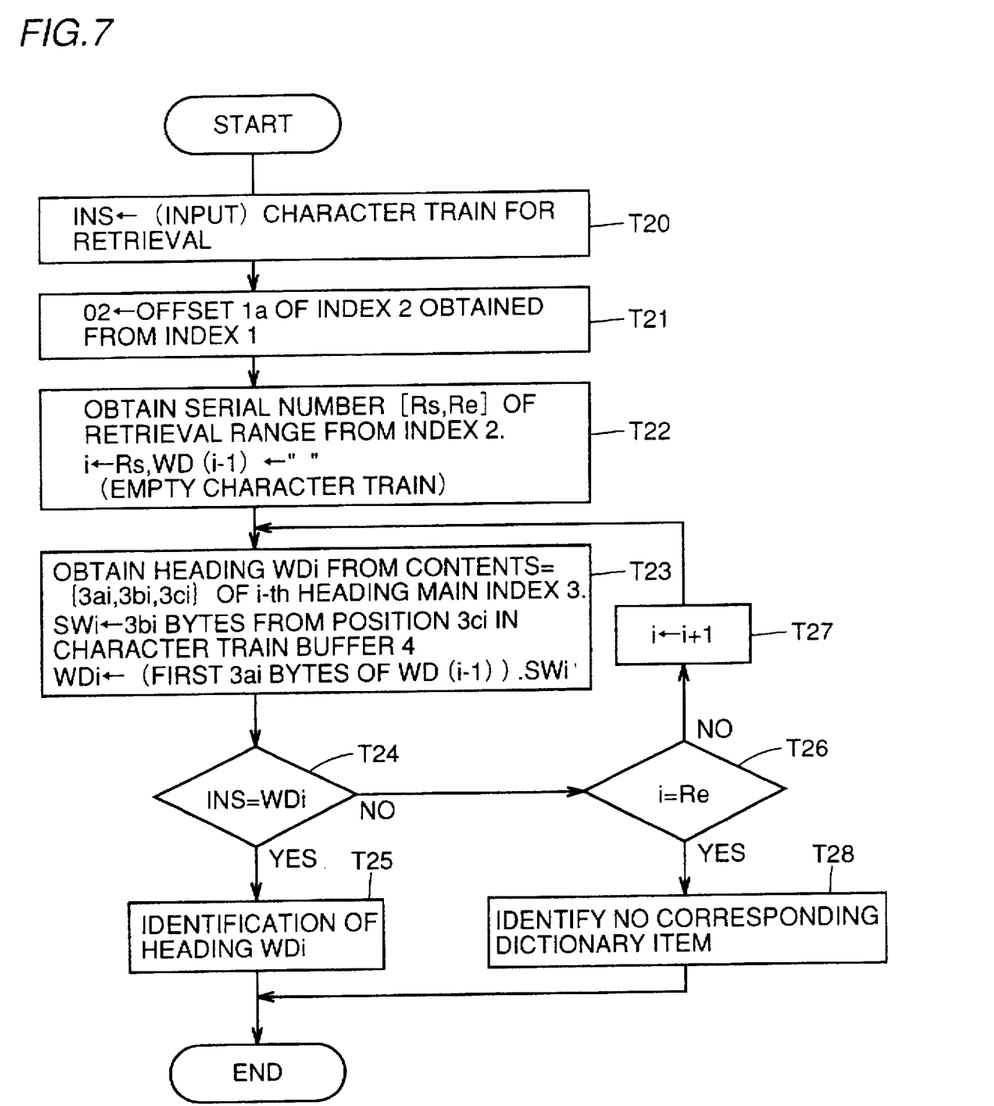
FIG. 7 is a flow chart of a retrieval process using an index according to an embodiment of the present invention.

FIG. 7 is a flow chart showing a retrieval procedure for confirming whether a character train of a heading matching an input character train is present in heading main index 3 generated according to the flow chart of FIG. 6 by scrolling through first index 1 and second index 2.

It is assumed that each item in second index 2 has a fixed length of K' bytes. Serial number 2a of a heading obtained by accessing an item of offset x (offset 1a) of second index 2 is represented by R(x). Similarly, a heading character train obtained by accessing the item of offset x of second index 2 is represented by M(x). First, a character train input via input device 104 is extracted and set into a character train INS for retrieval (T20). Then, the item of first index 1 determined by the code of the first character in character train INS is accessed to obtain a value of first index 1, i.e. offset 1a to second index 2, which is set in offset o2 (T21). Then, the (o2+K')th byte from the beginning of second index 2 is accessed. The value of the accessed item of second index 2, i.e. serial number R(o2+K') of heading main index 3 is obtained. Item I in heading main index 3 corresponding to the obtained serial number (o2+K') is accessed to restrict the range [Rs, Re] of the serial number that has the possibility of including a heading matching input character train INS (T22). The restricting process of this range of the serial number [Rs, Re] is set forth in the following.

The procedure will be described of obtaining a heading character train M(o2+K') corresponding to serial number R(o2+K') at the accessed position of second index 2. Since item I in heading main index 3 has a fixed length of K bytes, the contents of item I of the R(o2+K')th serial number in index 3 can be obtained by accessing (serial number R(o2+K')*K)th byte position from the beginning of index 3. Here, the difference with one preceding heading is not taken since serial number R(o2+K') is a serial number obtained from index 2. Therefore, by calling up a character train by a differential character train length 3b from the accessed position of differential character train buffer 4 by pointer 3c in the accessed item I, the called up character train is the required heading character train M(o2+K').

The dictionary order of the obtained heading character train M(o2+K') and input character train INS is compared. If the dictionary order of input character train INS is ahead of heading character train M(o2+K'), character train INS is equal to or subsequent to character train M(o2). Therefore, it is identified that the range of the presence of a heading that matches input character train INS is within the serial number range of [R(o2), R(o2+K')]. In contrast, if input character train INS is not ahead of heading character train M(o2+K') and character train M(o2+K')>character train M(o2), the heading that matches input character train INS is not present in the range of [R(o2), R(o2+K')]. In this case, the next item succeeding the current accessed item of second index 2, i.e. the (o2+2K')th byte is accessed to obtain serial number R(o2+2K') and heading character train M(o2+2K'). The order therebetween is compared again to identify whether the range of [R(o2+K'), R(o2+2K')] (in the case of character train M(o2+2K')>character train M(o2+K')) or the range of [R(o2+2K'), R(o2+2K')] (in the case of character train M(o2+2K')=M(o2+K')) accommodates the range for input character train INS. This operation is repeated until input character train INS is found to be smaller, i.e. located ahead of the heading character train obtained by the serial number of index 2. (Here, the offset of second index 2 is (o2+N*K'). Serial number Re of the required range of serial numbers is R(o2+N*K'). Serial number Rs is serial number R(o2+X*K') corresponding to an offset (o2+X*K') closest to the offset of (o2+N*K') so that character train M(o2+X*K')≠character train M(o2+(X−1)*K') where X<N.

According to serial numbers [Rs, Re] of the retrieval range determined as described above, the data in a corresponding heading main index 3 is sequentially accessed from serial number Rs to obtain a corresponding heading character train. The input character train INS and each obtained heading character train is compared according to the dictionary order. Here, the procedure (T23) of obtaining a heading character train corresponding to subsequent serial number from serial number Rs obtained by second index 2 will be described hereinafter.

For the sake of description, variable i=Rs for controlling the flow and heading character train WDi−1=" " (empty character train) are set. At the beginning, variable i is a serial number directly obtained from second index 2. Therefore, difference with one proceeding heading is not be taken for the heading corresponding to this serial number (refer to T4 of FIG. 6). By reading out a train of character of 3bi bytes (differential character train length 3b corresponding to serial number i obtained from index 3) from the position in buffer 4 indicated by pointer 3ci (pointer 3c corresponding to serial number i obtained by main index 3), this read out character train will be the heading character train WDi.

To access item I corresponding to serial number i in heading main index 3, the i*K−th byte position from the beginning is to be accessed assuming that item i has a fixed length of K bytes. In order to obtain the next heading character train WDi by incrementing serial number i by 1, a character train of differential character train length 3bi from the position indicated by pointer 3bi of differential character train buffer 4 is connected to the character train of 3ai bytes (number of overlapping characters 3a corresponding to serial number i obtained from index 3) from the beginning of a proceeding heading character train WD (i−1) if differential character train length 3bi≠0.

The obtained i-th heading character train WDi and input character train INS are compared according to the dictionary order. If they match each other, the relevant heading of interest is identified as heading character train WDi (T24, T25). If the comparison does not match, serial number i is incremented by 1 (T27) within the range of serial number i<serial number Re ("N" in T26) to sequentially carry out a comparison with the next heading. If there is no matching heading in the serial number range of [Rs, Re], it is identified that the heading of interest corresponding to input character train INS is not registered in that index 3, i.e. in the corresponding dictionary (T28).

The operation of adding new index data to the currently available index data for heading retrieval will be described hereinafter.

This supplement operation takes advantage of the characteristics of the above-described differential character train buffer 4. Differential character train buffer 4 is generally of a great capacity depending upon the dictionary used for retrieval. There is a high possibility that the additional registration of a differential character train of an average length of the same language matches a differential character train already registered in character train buffer 4. In the present embodiment, increase in the capacity of buffer 4 is suppressed by avoiding the presence of a duplicated partial character train in differential character train buffer 4.

Figure 8:
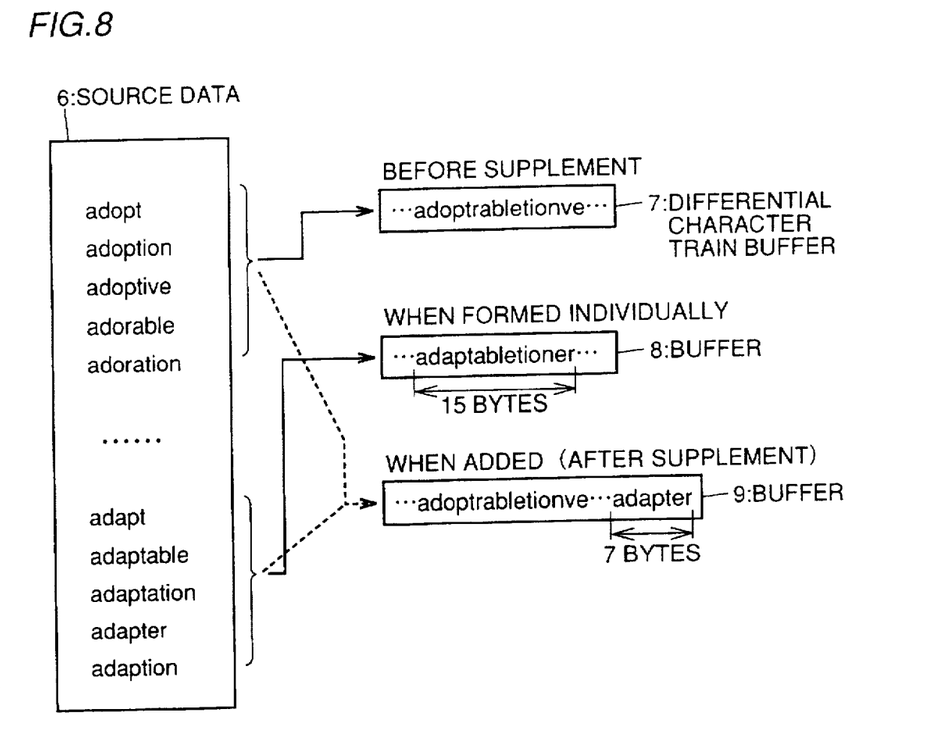
FIG. 8 is a diagram for describing the effect of a differential character train buffer in supplementing a retrieval function according to an embodiment of the present invention.

Referring to FIG. 8, a case is considered where differential character trains of the headings "adopt" to "adoration" in source data 6 are present in the already-formed differential character train buffer 7, and that headings "adapt" to "adaption" are not present in the original dictionary, which will have to be added thereto.

If a differential character train buffer according to the present embodiment is formed solely for the additional headings, a further 15 bytes are required as the differential character train buffer as shown in buffer 8 of FIG. 8. However, if the already-formed differential character train buffer 7 can be used, only 7 bytes has to be added to buffer 7 as shown in buffer 9. This means that the approach of adding a new differential character train into the already-formed differential character buffer is effective from the standpoint of reducing the required memory capacity in contrast to the case where a buffer of entirely new differential character trains is generated.

In order to add a new differential character train into the already-formed differential character train buffer, a set of differential character trains to be added is combined with a set of a differential character trains that is the basis of differential character train buffer 4 to form a differential character train buffer again. Accordingly, differential character train buffer 4 having data redundancy eliminated can be shared by the supplemental differential character train and currently existing differential character train.

Figure 9:
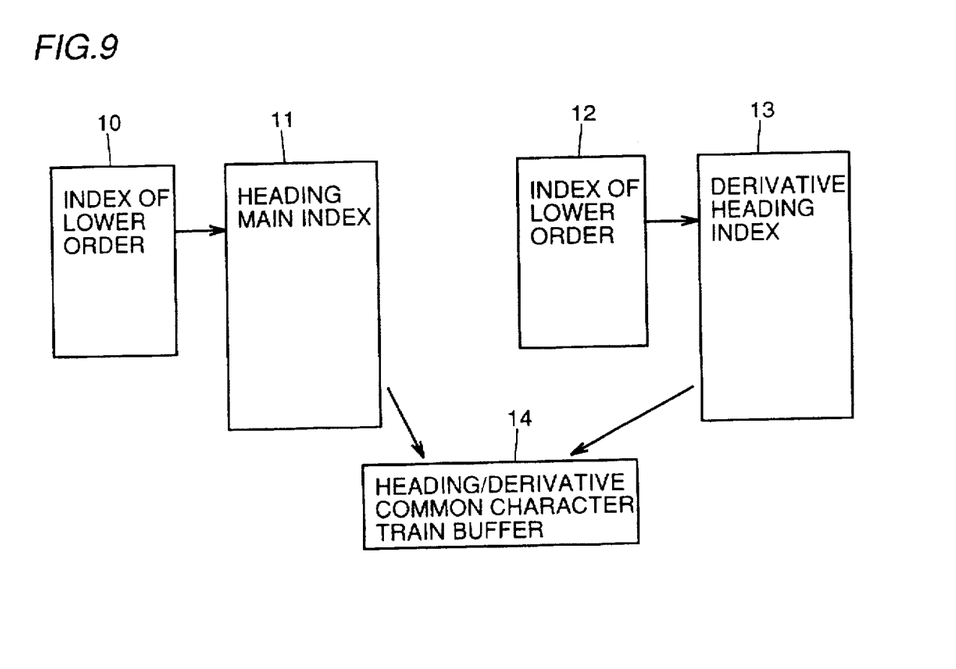
FIG. 9 schematically shows an index structure of the case where a derivative retrieval function is added to a heading retrieval function according to an embodiment of the present invention.

FIG. 9 shows an index structure of the case where a derivative retrieval function is added to a heading retrieval function according to an embodiment of the present invention. As shown in FIG. 9, a differential character train buffer (14) is commonly shared by the heading retrieval function (10, 11) and the derivative retrieval function (12, 13).

The procedure of supplementing index data according to the common usage of a differential character train buffer will be described with reference to the flow chart of FIG. 10. The case of adding a new heading set A to the exiting heading set M is envisaged. First and second indexes having a structure similar to set M are generated for set A as shown in FIG. 6 by adding a new heading set A={A0, A1, . . . , Am} to existing heading set M={M0, M1, . . . , Mn} (T30, T31).

According to the procedure of generating a heading main index described with reference to FIG. 6 (refer to T3 and T4 in FIG. 6), the number of overlapping characters ADi, a differential character train length ASi and a differential character train AASi are obtained with respect to each element in set A (T32). Then, an entire differential character train set S={MS0, . . . , MSn, AAS0, . . . AASm} which is the combination of differential character train MSi with respect to the existing heading set M and differential character train AASi with respect to the newly added set A is obtained to generate a set S'={S0', . . . , Sk'} (where k=n+m+1) which has the elements of set S sorted in the order of the character train length (T33).

The procedure (T34–T37) forming a character train buffer mjb corresponding to set S' is identical to that shown in FIG. 6 (refer to T6–T9 of FIG. 6). Since the pointer for buffer mjb with respect to each element of set S' is also obtained when buffer mjb is formed, pointer PMj of each element in set M with respect to a differential character train buffer and pointer PAj of each element in set A with respect to a differential character train buffer are respectively set in a corresponding heading main index. As a result, heading main indexes with respect to set M and set A are formed (T39).

Figure 10:
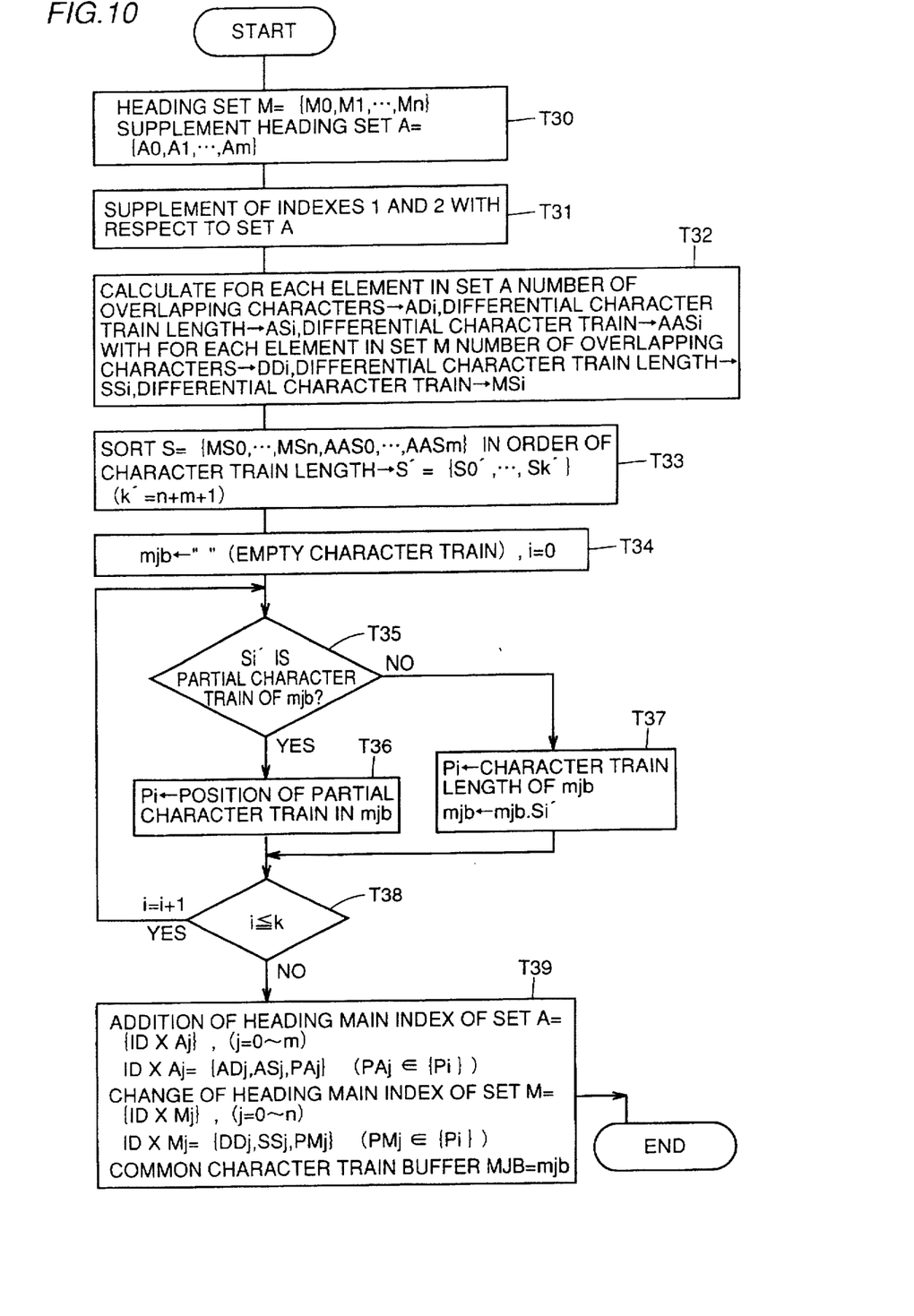
FIG. 10 is a flow chart of a supplemental process of index data due to a share of a differential character train buffer according to an embodiment of the present invention.

Heading main indexes 3 formed according to the flow chart of FIG. 10 have an index structure of a fixed length. They are formed so that the access time with respect to a preceding or succeeding item (item I) is reduced. The differential character train buffer reconstructed according to this flow chart so as to have no redundant data and to be shared with the differential character train buffer of the original heading index. The reconstructed character train buffer has a capacity smaller than the general one in which a differential character train is arranged with a delimiter (Ψ0). The memory capacity can be reduced to approximately 1/10 the normal capacity with respect to a dictionary having a plurality of headings of several 10K. Furthermore, the required memory capacity can be reduced in comparison to the case where another character train buffer is generated independently with no common usage (approximately 1/2 the capacity of the buffer generated independently with respect to the addition of a plurality of headings of several 10K). According to the present embodiment, improvement of a retrieval function by adding another heading index data to the existing index data will not degrade the effect of suppressing increase in the memory capacity due to the supplemental data.

Heading retrieval via the index unit of the supplement dictionary data is carried out in a manner similar to that of the flow chart of FIG. 7, and will otherwise not be repeated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A dictionary retrieval apparatus including at least an index unit for retrieval of dictionary data in which a plurality of headings are registered in dictionary order for retrieving a specified heading from said dictionary data via said index unit and providing a retrieval result, wherein said index unit comprises:

a character train buffer in which a differential character train for each of the plurality of headings in said dictionary data is stored coupled to the end of an existing character train already stored in said character train buffer without overlapping any partial character train in said existing character train, said differential character train being a partial character train that does not match the character train of a heading registered right before a certain heading in said dictionary data, a main index including an item of a fixed length in said dictionary order corresponding to each of the plurality of headings in said dictionary data, said item having stored therein matching length information indicating a length of a partial character train matching a character train of said heading registered right before said certain heading in said dictionary data of said character train of a corresponding said heading, differential length information indicating a length of said differential character train of a corresponding said heading, and position information indicating a storage position in said character train buffer of said differential character train of a corresponding said heading, and a sub index used for accessing respective contents of a plurality of said items in said main index according to a character train of said specified heading.

2. The dictionary retrieval apparatus according to claim 1, further comprising index unit generation means for generating said index unit, wherein said index unit generation means comprises means for generating said sub index, information detection means comparing from the first character a character train for each of said plurality of headings in said dictionary data with a character train of said heading registered right before said certain heading in said dictionary data for detecting said matching length information, said differential length information, and said differential character train, character train storage means responsive to said differential character train detected by said information detection means not matching any partial character train in said exiting character train in said character train buffer for coupling said differential character train to the end of said existing character train and storing the same into said character train buffer, and information storage means for storing into an item for each of said plurality of headings, in said main index said position information obtained by storage of a corresponding said differential character train into said character train buffer by said character train storage means, and corresponding said matching length information and said differential length information detected by said information detection means.

3. The dictionary retrieval apparatus according to claim 2, further comprising an extended index unit which is an extended version of said index unit when another dictionary data different from existing said dictionary data is to be supplemented, wherein said extended index unit comprises, in substitution for said character train buffer, an extended character train buffer in which said differential character train for each of said plurality of headings and a supplemental differential character train for each of the plurality of headings in said supplemental dictionary data are stored coupled to the end of an exiting character train already stored in said extended character train buffer without overlapping any partial character train in the existing character train of said extended character train buffer, said supplemental differential character train being a partial character train that does not match a character train of a heading that is registered right before a certain heading in said supplemental dictionary data of the character train, said main index unit having said position information for each of said plurality of items updated according to information indicating a storage position of a corresponding said differential character train in said extended character train buffer, said sub index unit, a supplemental main index including a first item of a fixed length in said dictionary order corresponding to each of said plurality of headings in said supplemental dictionary data, said first item having stored therein first matching length information indicating a length of a partial character train matching a character train of said heading registered right before the certain heading in said supplemental dictionary data of the character train of a corresponding said heading, first differential length information indicating a length of said supplemental differential character train of a corresponding heading, and first position information indicating a storage position in said extended character train buffer of said supplemental differential character train of the corresponding heading, and supplemental sub index used for accessing respective contents of said plurality of first items in said supplemental main index according to a character train of said specified heading.

4. The dictionary retrieval apparatus according to claim 3, further comprising extended index unit generation means for generating said extended index unit, wherein said extended index unit generation means comprises means for generating said supplemental subindex, extended information detection means comparing from the first character a character train for each of said plurality of headings in said supplemental dictionary data with a character train of a heading registered right before said certain heading in said supplemental dictionary data for detecting said first matching length information, said first differential length information, and said supplemental differential character train, extended character train storage means responsive to said differential character train detected by said information detection means and said supplemental differential character train detected by said extended information detection means not matching any partial character train in a character train already stored in said extended character train buffer for coupling said differential character train or said supplemental differential character train to the end of a character train in said extended character train buffer and storing the same, update means for updating said position information corresponding to said main index using information indicating position of said differential character train stored in said extended character train buffer by said extended character train storage means, and extended information storage means for storing into a corresponding said first item in said supplemental main index said first position information of said additional differential character train, and said first matching length information and said first differential length information detected by said extended information detection means.

5. The dictionary retrieval apparatus according to claim 4, wherein said information for updating said position information by said update means indicates an offset of a matching said partial character train in said extended character train buffer and a length of said character train already stored in said extended character train buffer when determination is made by said extended character storage means that a corresponding said differential character train has a matching partial character train in at least one of said partial character trains in said character train already stored in said extended character train buffer and when determination is made that there is no match, respectively, and wherein said first position information indicates an offset of a matching said partial character train in said extended character train buffer and a length of said character train already stored in said extended character train buffer when determination is made by said extended character train storage means that a corresponding said supplemental differential character train has a matching partial character train in at least one of said partial character trains of said character train already stored in said extended character train buffer and when determination is made that there is no match, respectively.

6. The dictionary retrieval apparatus according to claim 2, wherein said position information indicates an offset of a matching partial character train in said character train buffer and indicates a length of said existing character train in said character train buffer when determination is made by said character train storage means that corresponding said differential character train matches any of at least one of said partial character trains in said existing character train in said character train buffer, and that corresponding said differential character train does not match any partial character train, respectively.

7. The dictionary retrieval apparatus according to claim 1, further comprising an extended index unit which is an extended version of said index unit when another dictionary data different from existing said dictionary data is to be supplemented, wherein said extended index unit comprises, in substitution for said character train buffer, an extended character train buffer in which said differential character train for each of said plurality of headings and a supplemental differential character train for each of the plurality of headings in said supplemental dictionary data are stored coupled to the end of an exiting character train already stored in said extended character train buffer without overlapping any partial character train in the existing character train of said extended character train buffer, said supplemental differential character train being a partial character train that does not match a character train of a heading that is registered right before a certain heading in said supplemental dictionary data of the character train, said main index unit having said position information for each of said plurality of items updated according to information indicating a storage position of a corresponding said differential character train in said extended character train buffer, said sub index unit, a supplemental main index including a first item of a fixed length in said dictionary order corresponding to each of said plurality of headings in said supplemental dictionary data, said first item having stored therein first matching length information indicating a length of a partial character train matching a character train of said heading registered right before the certain heading in said supplemental dictionary data of the character train of a corresponding said heading, first differential length information indicating a length of said supplemental differential character train of a corresponding heading, and first position information indicating a storage position in said extended character train buffer of said supplemental differential character train of the corresponding heading, and supplemental sub index used for accessing respective contents of said plurality of first items in said supplemental main index according to a character train of said specified heading.

8. The dictionary retrieval apparatus according to claim 7, said supplemental subindex including a supplemental first index and a supplemental second index, wherein said supplemental first index is used to access in one-to-one correspondence information in said supplemental second index, and having a corresponding offset information stored therein of said supplemental second index for each different first character of respective character trains of said plurality of headings in said supplemental dictionary data, wherein said supplemental second index is used to access in one-to-one correspondence said first item in said supplemental main index, and has number information stored therein of said heading extracted for every change of the first character according to said dictionary order of the number information according to said dictionary order for each of said plurality of headings in said supplemental dictionary data, wherein said first matching length information and said first differential length information indicate 0 and a character train length of said certain heading, respectively, when said number information of a corresponding heading is stored in said supplemental second index.

9. The dictionary retrieval apparatus according to claim 1, said sub index including a first index and a second index, wherein said first index is used to access in one-to-one correspondence information in said second index, and has a corresponding offset information of said second index stored therein for each different first character of respective character trains in said plurality of headings in said dictionary data, wherein said second index is used to access in one to one correspondence said item in said main index, and has number information stored therein of said heading extracted for every change of the first character according to said dictionary order out of number information according to said dictionary order of each of said plurality of headings in said dictionary data, wherein said matching length information and said differential length information indicate 0 and a character train length of a relevant heading, respectively, when said number information of a corresponding heading is stored in said second index.

10. The dictionary retrieval apparatus according to claim 1, further comprising retrieval means for retrieving said specified heading from said dictionary data via said index unit, wherein said retrieval means comprises sub retrieval means for retrieving said sub index using a character train of said specified heading, main retrieval means for retrieving said main index using a retrieval result of said sub retrieval means, retrieval range identify means for identifying a retrieval range of said main index corresponding to said specified heading according to a retrieval result of said main retrieval means, and item retrieval means for retrieving an item of a heading in said dictionary data that matches said specified heading out of a plurality of said items corresponding to said identified retrieval range.

\* \* \* \* \*